Figure 3:
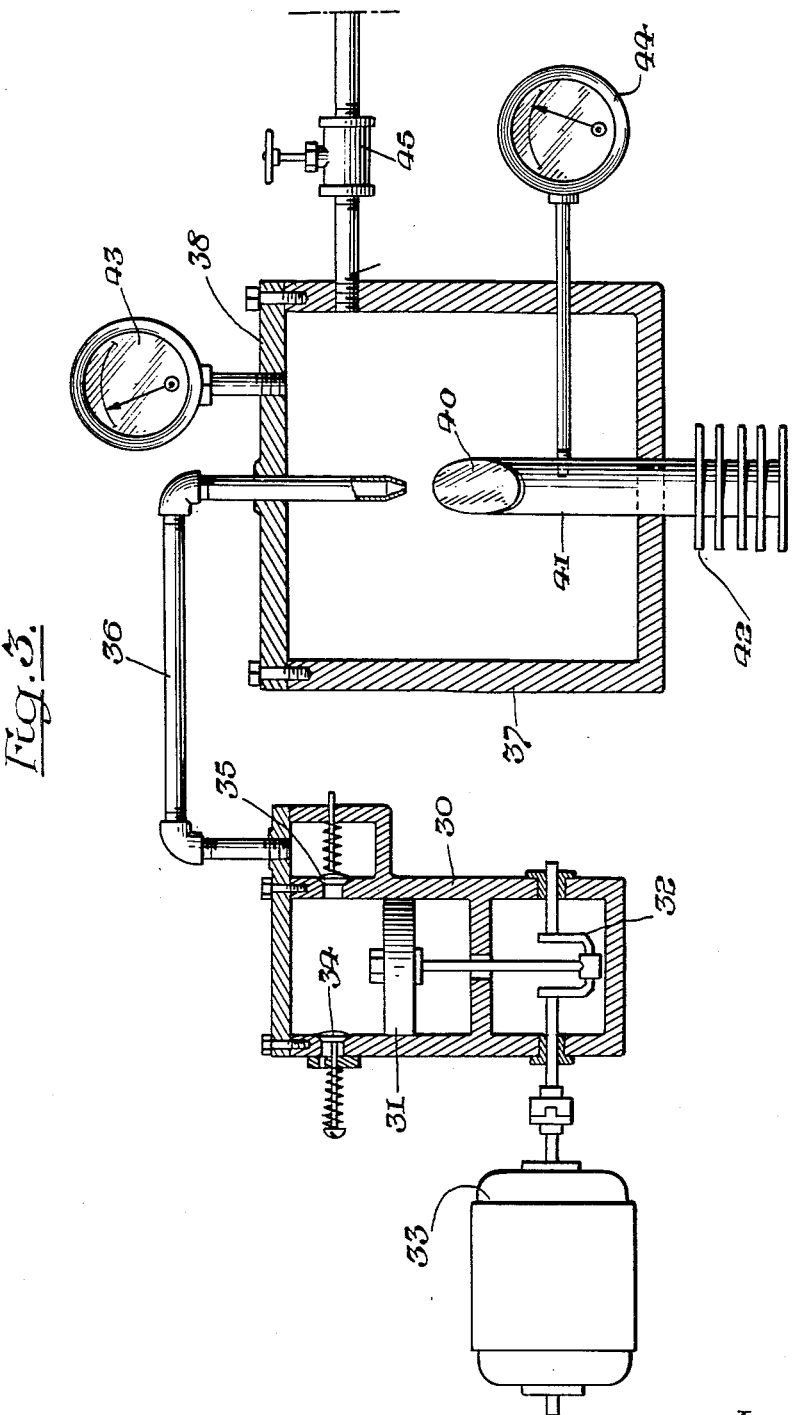

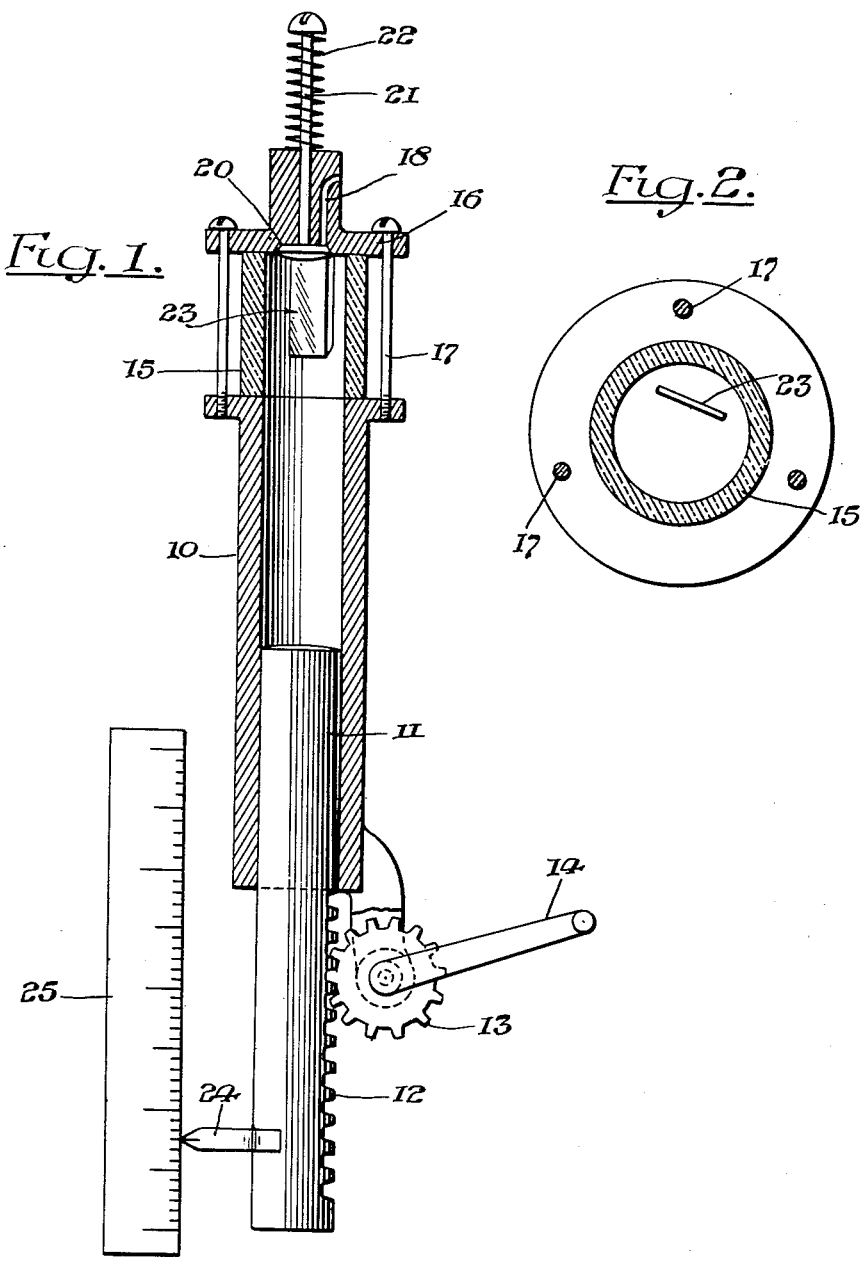

Aug. 23, 1955      J. M. BRADY      2,715,836
APPARATUS FOR DETERMINATION OF RELATIVE HUMIDITY
Filed June 25, 1951      2 Sheets-Sheet 2

Inventor:
James M. Brady
by his Attorneys,
Darby & Darby 2,715,836
Patented Aug. 23, 1955

2,715,836

APPARATUS FOR DETERMINATION OF RELATIVE HUMIDITY

James M. Brady, West Long Branch, N. J., assignor to Harrison D. Brailsford, Rye, N. Y.

Application June 25, 1951, Serial No. 233,360

3 Claims. (Cl. 73—335)

The present invention relates to improvements in devices for the determination of relative humidity, the detection of the dew point and the like. It is particularly of the character designed for the detection of the point at which moisture from the air condenses on an object with which the air comes into contact as the sample measured is compressed in a closed chamber in which the object is located.

It is an object of the present invention to provide a device for measuring relative humidity which includes a compression chamber and an object within said chamber on which moisture will condense.

It is another object of the invention to provide such a device in which the object within the chamber is in the form of a mirror formed of a substance having a high heat conductivity and in heat conductive relationship with the external atmosphere.

It is a further object of the invention to provide a relative humidity determining device which is simply and economically manufactured and which can be readily utilized.

The device of my invention may be constructed either as a humidity determining device having a manually operated compressor or may be constructed with a motor driven compressor. Although I have above mentioned several objects of my invention, other objects and features will, nonetheless, be apparent from the following description when considered in connection with the appended drawing in which Figure 1 is a longitudinal cross sectional view of an apparatus in accordance with my invention for determining the relative humidity of random samples of air;

Figure 2 is a transverse cross-sectional view of the device of Figure 1 taken on the plane 2—2 of Figure 1; and Figure 3 is a vertical cross-sectional view of the modification of the device utilized for the continuous determination of relative humidity of air or gas flowing through the device.

Referring now to the drawings there is shown in Figures 1 and 2, the form of my invention in which the air is compressed by manual means. The apparatus comprises a cylinder 10. Within the cylinder 10 is a plunger 11 which plunger has formed integrally therewith at its lower end a rack 12. Meshing with the rack 12 is a gear 13 to the shaft of which is fixed a conventional handle 14.

The upper end of the cylinder 10 comprises a transparent cylindrical section 15, the upper end of which is closed by the cylinder head 16. The cylinder head 16 is clamped to the cylinder 10 by means of the clamping bolts 17 or in any other suitable manner. Formed in the cylinder head 16 is a passage 18 communicating with the interior of cylinder 10, the passage being normally closed by means of a valve 20, the stem 21 of which is guided in a bore in cylinder head 16, the valve being normally held in closed position by means of spring 22. The cylinder head 16 is formed of a material such as metal having a high heat conductivity and has attached thereto a metallic mirror 23 which is suspended centrally within the upper portion of the cylinder 10, and specifically within the cylindrical section 15 so that it may be readily observed.

As is well known, when air or gas containing water or other vapor is compressed, the suspended vapor will, as compression proceeds, reach the saturation point. Assuming a constant temperature during the compression the saturation point will be reached when the reduction in volume caused by the compression bears the following mathematical relationship to the percentage of vapor present.

$$H_r = \frac{V_2}{V_1} \times 100$$

In this equation $H_r$ equals per cent relative humidity, $V_1$ equals the volume prior to compression and $V_2$ equals the volume after compression.

As an example, if the air contains 50% of its maximum possible moisture content for a given temperature, i. e., has a relative humidity of 50%, then compression of the air would cause complete saturation when the volume had been reduced to one-half its original value, assuming that the temperature could be maintained at the value existing at the start of compression. However, compression is invariably accompanied by a rise in temperature and therefore such saturation does not occur in practice. Nonetheless if an object within the space where the air is being compressed can be maintained at least temporarily at the initial temperature, then, at the instant of saturation, moisture will condense on the surface of that object and if the object is provided with a highly polished surface the appearance of this condensate will be visible. The mirror 23 of Figures 1 and 2 forms such an object. It is integral with or rigidly attached to the highly heat conductive cylinder head 16 and will therefore maintain its temperature at substantially that of the external atmosphere during compression of the air in cylinder 10.

The device is operated in the following manner:

Plunger or valve stem 21 is depressed and crank 14 is rotated in a counterclockwise direction to its maximum extent thus withdrawing the plunger 11 to its lowest position in the cylinder 10. At this position the pointer 24 fixed to the plunger 11 is in alignment with the lowermost mark on the scale 25 which is fixed in position as respects the cylinder 10. Also at this time the cylinder 10 has been filled with a sample of the air to be measured. The plunger 21 is now released and valve 20 closed by the action of spring 22.

Now the crank 14 is rotated in clockwise direction moving the plunger 11 upward in a cylinder 10 and compressing the contained sample of air. The metal mirror 23 is constantly observed through the transparent portion 15 of the cylinder 10. When a film of moisture appears on the mirror 23 the position of the pointer 24 on the scale 25 will represent the amount of contained moisture in the original sample of air in terms of per cent relative humidity.

The second form of my invention is shown in Figure 3 and employs the same principles as does the device just above-described. However, in the Figure 3 form air flows continuously through the device due to the action of a motor driven compressor.

The device of Figure 3 comprises a cylinder 30 having a piston 31 operating therein, the piston being driven in any suitable manner as by means of the crank shaft 32 and motor 33.

As is customary, the compressor consisting of the cylinder 30 and its piston 31 is provided with a spring-biased inlet valve 34 and a similar spring-biased outlet valve 35. Compressed air from the compressor 30 is then fed through the conduit 36 to a test chamber 37. The chamber 37 is of any suitable form being shown in the drawing as cylindrical and is equipped with an airtight cylinder head 38. Placed within the cylinder or chamber 37 is a mirror 40 which is supported by means of the stem 41 from the base of the housing or chamber 37.

The mirror 40 and stem 41 are of metallic material of high heat conductivity. The stem 41 extends through the base of the chamber 37 and is provided at its lower end with a plurality of fins 42 which serve to provide ready heat transference between the mirror 40, stem 41 and the atmosphere surrounding the chamber 37.

Mounted externally of the chamber 37 is a pressure gage 43 which communicates with the interior of the chamber and a thermometer 44 the operating elements of which are in contact with the stem 41 so that the temperature thereof may be read upon the scale of thermometer 44. There is also provided an adjustable valve 45 by means of which the pressure in the interior of chamber 37 may be adjusted.

Since, as has been indicated above, the relative humidity may be determined in terms of the pressures or volumes of air, then it will be possible by determining such pressures at the time when moisture condenses on the mirror 40 to determine the relative humidity of the air then in the chamber. Expressed mathematically $$H_r = \frac{P_0}{P_1} \times 100$$

where $H_r$ is the per cent relative humidity of the air being measured at the ambient temperature of that air, $P_0$ is the absolute pressure of the air being measured and $P_1$ is the absolute pressure of air required to produce condensation, i. e., saturation.

In operating the device just described, the valve 45 is gradually opened until a film of condensed moisture is just visible on the surface of the mirror 40. At this time the absolute pressure indicated on gage 43 in conjunction with the reading of a barometer located against the equipment will yield the data for calculating per cent relative humidity of the air or gas being tested through use of the above equation. The reading of thermometer 44 is a measure of the ambient temperature of the air since the air was taken from the atmosphere surrounding the apparatus, and the dew point may be determined by reading of a family of curves plotted with the thermometer reading as one coordinate and the gage reading as the other coordinate. Further, should it be desirable to ascertain the vapor pressure of the air being measured, this can readily be done using the equation $$e_0 = e_1 \times \frac{P_0}{P_1}$$

in which $e_0$ equals the vapor pressure of the air being measured and $e_1$ equals the saturated vapor pressure of air at the temperature at which the measurement is taken. The factor $e_1$ can be procured from a commonly utilized table since the temperature is given by thermometer 44. Therefore the equation can be solved for $e_0$ the desired vapor pressure.

In the above description I have considered the measurement of relative humidity in the range beneath 100% only. However, the device of my invention is also useful in determining the degree of super heat. For example, in steam turbines wet steam is undesirable and this equipment can be used to determine when such detrimental conditions arise. When utilized for this purpose the sample is rarified rather than compressed and the scale is arranged so that this rarification can be readily indicated.

While I have described the preferred embodiments of my invention it will be obvious that many other forms may be devised and I wish therefore not to be limited by the foregoing description, but on the contrary, solely by the claims granted me.

What is claimed is:

1. In a device for determining the per cent relative humidity of a gas, in combination, a cylinder, a piston in said cylinder, a valve for admitting a gas into said cylinder as the piston is operated to increase the volume of said cylinder to a predetermined amount, a member of high heat conductivity, said member having a portion thereof highly polished to form a mirror, mounted on said cylinder to close one end thereof with the mirror portion extending within said cylinder and visible through a window in the wall of said cylinder, said portion being conductively connected with the external atmosphere whereby the portion of the member in the chamber tends to remain at the temperature of the gas outside the chamber, means for closing said valve, means for compressing the gas sample drawn into said cylinder and means connected to said piston for moving over a scale fixed relative to said cylinder to indicate directly the per cent relative humidity when the compression has proceeded to the point where moisture forms on said mirror portion.

2. In an apparatus for determining the relative humidity of a gas, in combination, a closed chamber, means for admitting gas from outside said chamber to said chamber, means comprising a piston in said chamber for compressing the gas therein, a member of high heat conductivity material mounted on said chamber to close one end thereof and having a highly polished surface portion extending into said chamber, said member being in heat exchange relationship with the gas outside said chamber whereby the portion of the member in the chamber tends to remain at the temperature of the gas outside the chamber, said chamber having a transparent portion through which said surface may be observed, and means comprising a scale fixed with respect to said chamber and a pointer fixed with respect to said piston for indicating the volume within said cylinder after compression relative to the total volume before compression.

3. In an apparatus for determining the relative humidity, in combination, a closed chamber, a manually operable valve, a passage leading from said closed chamber to the atmosphere outside, said passage being normally closed by said valve, a piston operable in said chamber for increasing the pressure and decreasing the volume of air or gas admitted thereto through said passage and said valve, a rack fixed to said piston externally of said chamber, a gear meshing with said rack, a crank handle fixed to said gear whereby said rack and piston may be moved, a member of high heat conductivity material mounted on said chamber to close one end thereof, said member being beyond the point of maximum excursion of said piston, said member being in heat exchange relationship with the atmosphere outside said chamber whereby the portion of the member in the chamber tends to remain at the temperature of the gas outside the chamber, and said member having a portion thereof highly polished to form a mirror surface said portion lying within said chamber, a transparent section in a wall of said chamber through said highly polished surface may be observed, a scale fixed in position relative to said chamber and an indicator fixedly positioned on said rack in position to move over said scale as said rack and piston are moved whereby said scale may be calibrated in per cent relative humidity and the reading on said scale when moisture is observed to form on said mirror is a direct indication of the relative humility of the air or gas admitted to said chamber.

References Cited in the file of this patent

UNITED STATES PATENTS

| | | |
|---|---|---|
| 2,380,082 | Soan | July 10, 1945 |
| 2,566,307 | Boyle | Sept. 4, 1951 |